(12) United States Patent
Baumann et al.

(10) Patent No.: US 8,448,755 B2
(45) Date of Patent: May 28, 2013

(54) DISK BRAKE

(75) Inventors: Dietmar Baumann, Hemmingen (DE); Dirk Hofmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 647 days.

(21) Appl. No.: 12/518,939

(22) PCT Filed: Nov. 29, 2007

(86) PCT No.: PCT/EP2007/062971
§ 371 (c)(1),
(2), (4) Date: Oct. 23, 2009

(87) PCT Pub. No.: WO2008/071550
PCT Pub. Date: Jun. 19, 2008

(65) Prior Publication Data
US 2010/0032249 A1    Feb. 11, 2010

(30) Foreign Application Priority Data

Dec. 12, 2006 (DE) .......................... 10 2006 058 750
Apr. 4, 2007 (DE) .......................... 10 2007 016 250

(51) Int. Cl.
*F16D 55/14*    (2006.01)
(52) U.S. Cl.
USPC ........................................ 188/72.4; 188/72.1
(58) Field of Classification Search
USPC ............................................. 188/72.2–72.5
See application file for complete search history.

(56) References Cited

U.S. PATENT DOCUMENTS

| 3,338,354 | A | * | 8/1967 | Jeffries ...................... 188/196 P |
| 3,700,075 | A |   | 10/1972 | Mortimer et al. |
| 3,734,248 | A | * | 5/1973 | Fay ................................ 188/345 |
| 4,188,073 | A | * | 2/1980 | Ishikawa et al. ................ 303/87 |
| 4,765,692 | A | * | 8/1988 | Miyake ...................... 303/115.4 |
| 5,024,298 | A |   | 6/1991 | Schenk et al. |
| 5,700,067 | A | * | 12/1997 | Heubner .......................... 303/9 |
| 7,114,600 | B2 | * | 10/2006 | Boisseau ...................... 188/72.7 |
| 7,559,412 | B2 | * | 7/2009 | Murayama .................. 188/72.2 |
| 2004/0154881 | A1 | * | 8/2004 | Baumann et al. ............ 188/72.2 |
| 2007/0045061 | A1 |   | 3/2007 | Murayama |

FOREIGN PATENT DOCUMENTS

EP    0398553 A1    11/1990

* cited by examiner

*Primary Examiner* — Christopher Schwartz
(74) *Attorney, Agent, or Firm* — Maginot, Moore & Beck

(57) ABSTRACT

The invention relates to a disk brake with an electromechanical actuator which, for example, has a piezo-element, and with a hydraulic self-energizing device. In order to control the self-energizing effect, the invention provides a valve hydraulically between an auxiliary piston of the self-energizing device and a brake piston of the disk brake with which the brake piston can be hydraulically isolated from the auxiliary piston. This means that the self-energizing effect of the disk brake can be switched off. Using a modulated valve control and/or use of a proportional valve, the level of the self-energizing effect can be controlled or regulated. In order to avoid a blockage, the invention additionally provides a blockage protection valve with which the auxiliary piston or the brake piston can be connected to a hydraulic accumulator at ambient pressure.

15 Claims, 5 Drawing Sheets

DISK BRAKE

CROSS-REFERENCE TO RELATED APPLICATION

This application is a 35 USC 371 application of PCT/EP 2007/062971 filed on 29 Nov. 2007.

BACKGROUND OF THE INVENTION

1. Field of the Invention

The invention relates to a disk brake.

2. Description of the Prior Art

From published German Patent Disclosure DE 1 480 005 A1, a disk brake is known, with a brake piston and with a friction brake lining that can be pressed by the brake piston against a brake disk for actuating the disk brake. The brake piston of the known disk brake acts transversely to the brake disk. The friction brake lining is displaceable transversely and parallel to the brake disk, the term "parallel" meaning a displacement in a circumferential or secant direction to the brake disk. The friction brake lining of the know disk brake is braced against a displacement parallel to the brake disk on an auxiliary piston, which like the friction brake lining is displaceable parallel to the brake disk. The auxiliary piston communicates with the brake piston.

If for actuation of the disk brake the friction brake lining is pressed against the rotating brake disk, the brake disk exerts a frictional force in its direction of rotation on the friction brake lining that is pressed against it. The friction brake lining is displaced in the direction of rotation of the brake disk and is braced on the auxiliary piston, which as a result is displaced into a cylinder bore in a brake caliper and generates a hydraulic pressure. Since the auxiliary piston communicates with the brake piston, the hydraulic pressure is transmitted to the brake piston, which presses the friction brake lining against the brake disk. Viewed in static terms, the same pressure acts on the auxiliary piston and on the brake piston; a ratio of the piston forces of the auxiliary piston and brake piston is equal to the inverse ratio of the piston faces that are acted upon hydraulically. The auxiliary piston and the brake piston communicating with it form a hydraulic self-boosting device, which utilizes the frictional force, exerted on the friction brake lining pressed against the brake disk by the rotating brake disk when the disk brake is actuated, as an auxiliary force for pressing the friction brake lining against the brake disk and as a result increasing a braking force of the disk brake.

SUMMARY AND ADVANTAGES OF THE INVENTION

The disk brake of the invention having the characteristics of claim 1, like the known disk brake, has a hydraulic self-boosting device, with an auxiliary piston that is displaceable parallel to the brake disk and communicates with a brake piston. Upon braking, the friction brake lining that is displaceable parallel to the brake disk is braced on the auxiliary piston, which generates a hydraulic pressure with which it acts on the brake piston and thereby increases a braking force of the disk brake. In the disk brake of the invention, a valve is disposed between the auxiliary piston and the brake piston; this is preferably a proportional valve. By closure of the valve, the brake piston is disconnected hydraulically from the auxiliary piston, so that the disk brake has no self-boosting. With the valve disposed between the brake piston and the auxiliary piston, the self-boosting can be switched or controlled or regulated. With the disk brake of the invention, brake actuation without an actuator or a connection to a master cylinder is possible. The hydraulic pressure required for the brake actuation is generated by the auxiliary piston, which acts on the brake piston communicating with it. The pressure of the auxiliary piston is generated by the frictional force which the rotating brake disk exerts on the friction brake lining pressed against it, this friction brake lining being braced on the auxiliary piston and as a result transmitting the frictional force to the auxiliary piston. The magnitude of the braking force is controlled or regulated by the valve that is disposed between the brake piston and the auxiliary piston. An auxiliary force required for the brake actuation is the frictional force exerted by the rotating brake disk on the friction brake lining that when the disk brake is actuated presses against it. The disk brake of the invention can thus be embodied as an auxiliary force brake. An actuator, master cylinder or pressure generating device, for instance having a hydraulic pump that generates braking pressure with external energy, are not absolutely necessary.

The invention makes high self-boosting possible and as explained above, in some embodiments, be embodied as an auxiliary force brake which for its actuation utilizes the frictional force, exerted by the rotating brake disk on the friction brake lining, as auxiliary force and does not require any muscle power or external force. This does not preclude the use of muscle power or external force for actuating the disk brake in embodiments of the invention. The self-boosting can be selected to be so high that the disk brake functions in self-locking fashion in the self-locking range or at least in a portion of the range of a coefficient of friction. Self-locking means that the self-boosting is so high that the clamping force and the braking force would increase up to the point of locking of the brake disk, unless that is precluded or prevented structurally or in some other way. The coefficient of friction is the quotient of the frictional force between the brake disk and the friction brake lining pressed against it and the clamping force with which the friction brake lining is pressed against the brake disk. It is dependent on such parameters as wet roads, dirt, and temperature and varies during operation. Because of the possibility of designing the disk brake of the invention for the self-locking range, high self-boosting is possible, which in turn means little actuation energy or even makes actuation without external energy possible. The disk brake requires no hydraulic connection; that is, no hydraulic line has to be laid to the disk brake. As a backup, the disk brake of the invention can readily be connected to a hydraulic pressure supply, to enable actuating it hydraulically as an auxiliary brake if its actuator fails.

A further advantage of the invention is that the hydraulics can be accommodated entirely in or on a brake caliper of the disk brake and do not require any brake hoses. A loss of brake fluid and absorption of water by diffusion can be avoided because the hydraulic system of the disk brake can be embodied in closed form, thereby precluding a loss of brake fluid. There is no need for replacing the brake fluid.

Because of the possibility of varying the magnitude of the self-boosting by means of the valve disposed between the auxiliary piston and the brake piston, the self-boosting can be adapted to the variable coefficient of friction, in order to keep the requisite actuation energy and hence to keep the stress on an actuator low. Also, by closure of the valve, the clamping force of the disk brake can be kept constant without the action of the actuator, and the actuator can be relieved thereby.

To enable initiating braking, a device with which the friction brake lining can be pressed against the brake disk is advantageously provided, at least as long as the disk brake as no actuator or the like. Such a device may for instance have a hydraulic pump with which the brake piston and/or the auxiliary piston can be subjected to pressure, or a hydraulic reservoir, which can be connected via a valve to the brake piston and/or the auxiliary piston.

For actuation solely with the frictional force, exerted by the rotating brake disk on the friction brake lining pressed against it, as auxiliary force, the disk brake of the invention is in particular designed in self-locking fashion. The control or regulation of the braking force as well as a limitation of the braking force, such that the disk brake does not lock the brake disk, is effected by means of the valve disposed between the auxiliary piston and the brake piston.

For actuating the disk brake the invention provides an actuator, with which the friction brake lining can be pressed against the brake disk. In particular, an electromechanical actuator is provided, which for example has a piezoelectric element. An electromechanical actuator with an electromagnet or with an electric motor and a gear is also possible. A mechanical, pneumatic, hydraulic or other kind of actuation of the disk brake of the invention is possible as well. If the actuator is present, then another device with which the friction brake lining can be pressed against the brake disk can be dispensed with. Because of the possibility of high self-boosting even of the self-locking design of the disk brake, a low-power and thus lighter-weight and smaller actuator suffices. The invention further provides that the brake piston is connected to a master cylinder of a hydraulic vehicle brake system. In this embodiment of the invention, the brake piston forms the actuator of the disk brake; this disk brake, like conventional disk brakes, is connected hydraulically to a vehicle brake system. A separate actuator is unnecessary. Since the disk brake with the auxiliary piston has hydraulic self-boosting, a (underpressure) brake force booster on the master cylinder or at some other point of the vehicle brake system is not necessary. The disk brake of an alternative embodiment is travel-boosting, not force-boosting. The invention further provides a hydraulic reservoir and a valve by which the auxiliary piston or the brake piston can be connected to the hydraulic reservoir. The valve may be a separate valve, or the connection to the hydraulic reservoir can be effected with the valve disposed between the auxiliary piston and the brake piston. With the valve and the hydraulic reservoir, a pressure reduction for antilock purposes is possible.

The invention further provides that the brake piston has two piston faces that can be acted upon hydraulically separately and that can be connected selectively to the auxiliary piston by means of valves. For the capability of separately acting on different piston faces, the brake piston can be embodied as a stepped piston. This embodiment of the invention makes variously high self-boosting actions possible, by connecting one or the other or both piston faces of the brake piston that can be separately acted upon to the auxiliary piston. Fundamentally, this embodiment of the invention can also be extended to more than two piston faces that can be acted upon hydraulically separately.

The same purpose is served by a variant embodiment, which provides two brake pistons that can be connected selectively to the auxiliary piston by means of valves. One brake piston may be an annular piston that surrounds the other brake piston. The two brake pistons may instead be disposed side by side or diametrically opposite one another on two sides of the brake disk.

BRIEF DESCRIPTION OF THE DRAWINGS

The invention will be described in further detail in terms of exemplary embodiments in conjunction with the drawings, in which.

DESCRIPTION OF THE PREFERRED EMBODIMENTS

Figure 1:
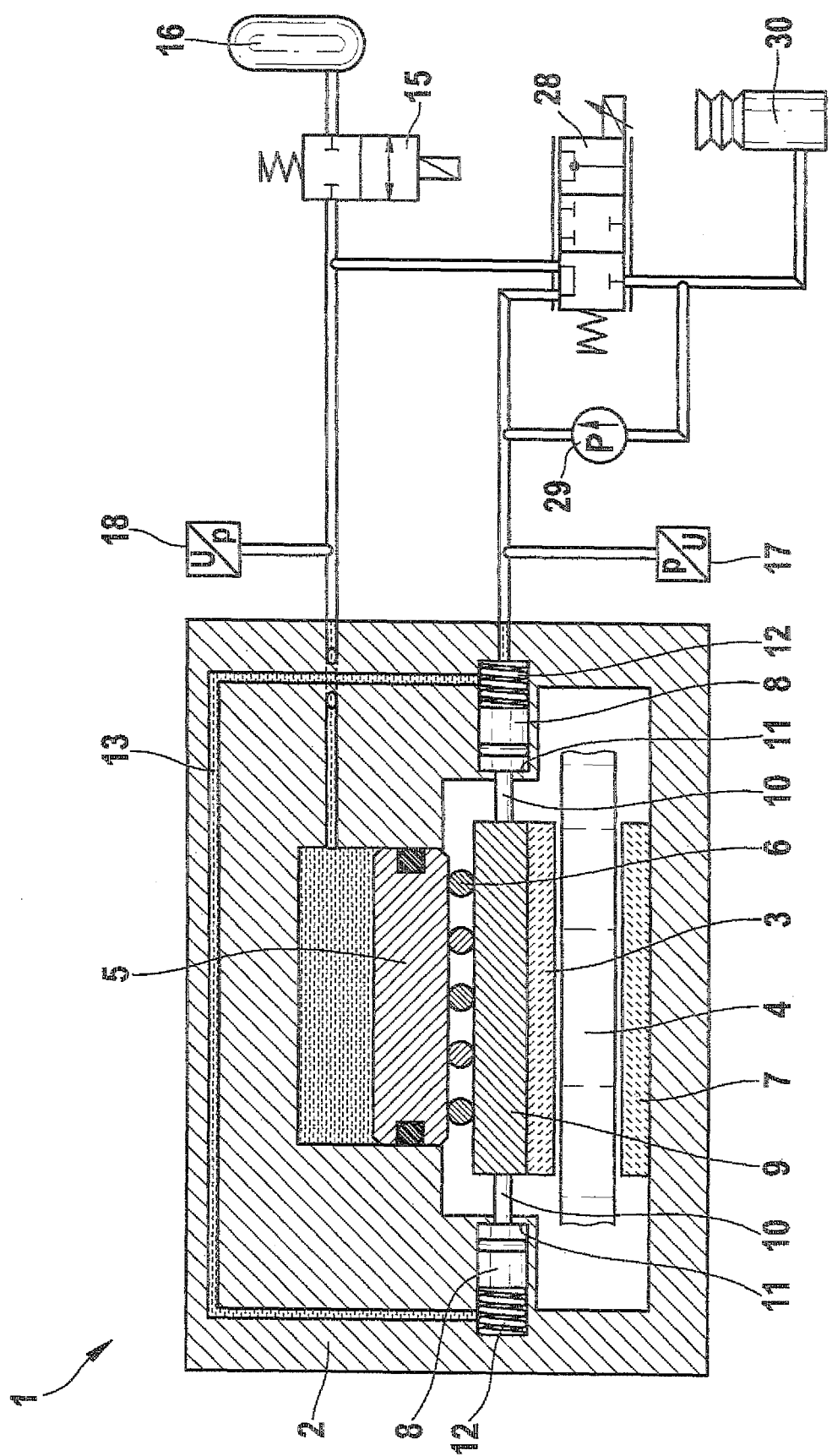
FIG. 1 is a schematic of a disk brake according to a first embodiment of the invention.

The disk brake 1 according to the invention shown in FIG. 1 has a brake caliper 2, in which a friction brake lining 3 is disposed on one side of a brake disk 4. The friction brake lining 3 can be pressed against the brake disk 4 by a brake piston 5. The friction brake lining 3 is movable transversely and parallel to the brake disk 4 in the brake caliper 2, "parallel" being intended to mean in a secant direction to the brake disk 4. For the displaceability parallel to the brake disk 4, the friction brake lining 3 is roller-supported with rollers as roller bodies 6. A slide bearing (not shown) is also possible. The friction brake lining 3 will hereinafter be referred to also as the moving friction brake lining 3. On the other side of the brake disk 4, a friction brake lining 7 is disposed immovably in the brake caliper 2; it will also be referred to hereinafter as a fixed friction brake lining 7, to distinguish from the movable friction brake lining 3. The brake caliper 2 is embodied as a Coating caliper; that is, it is guided displaceably transversely to the brake disk 4.

On the side of the movable friction brake lining 3, two auxiliary pistons 8 are disposed in the brake caliper 2, which are displaceable in the same direction as the movable friction brake lining 3, in other words parallel and in a secant direction to the brake disk 4. One auxiliary piston 8 each is disposed on each end of the friction brake lining 3, in terms of the circumferential direction of the brake disk 4; the movable friction brake lining 3 is braced on the auxiliary pistons 8 via a lining holder plate 9 and one tappet 10 each. A radially inward-protruding collar forms a stop 11 for the auxiliary pistons 8 that limits the motion of the auxiliary pistons 8 in the direction toward the friction brake lining 3. One restoring spring 12 each presses the auxiliary pistons 8 against the stops 11. The spring force of the restoring springs 12 is negligibly slight; it serves merely to return the auxiliary pistons 8 to their outset position.

The auxiliary pistons 8 or their cylinder bores communicate with one another through a bore or line 13 in the brake caliper 2. Moreover, a valve hereinafter also called a self-boosting valve 28 connects the auxiliary pistons 8 hydraulically with the brake piston 5. The self-boosting valve 28 is a 3/3-way proportional magnet valve, which in its currentless basic position connects the auxiliary pistons 8 to the brake piston 5. By closure of the self-boosting valve 28, the brake piston 5 can be disconnected hydraulically from the auxiliary pistons 8. In a further switching position, the self-boosting valve 28 connects the brake piston 5 and the auxiliary pistons 8 to a pressureless hydraulic reservoir 30.

A hydraulic pump 29, with which brake fluid can be pumped out of the hydraulic reservoir 30 to the auxiliary pistons 8, is connected hydraulically parallel to the self-boosting valve 28.

A valve hereinafter called the antilock valve 15 connects the auxiliary pistons 8 with a hydraulic reservoir 16 (pressure reservoir). The antilock valve 15 is a 2/2-way magnet valve. The described hydraulic system of the disk brake 1 is hermetically sealed; the disk brake 1 has no hydraulic connection to the outside. The valves 14, 15, whose symbols are shown in the drawings next to the brake caliper 2, are inserted into the brake caliper 2 in the practical embodiment of the invention. The hydraulic reservoir 16 is integrated with the brake caliper 2 or mounted on it. As a result, no external brake lines and in particular no hose lines are necessary through which brake fluid could diffuse out or water could diffuse in.

One pressure sensor 17 is connected to the auxiliary pistons 8, and a further pressure sensor 18 is connected to the brake piston 5.

The actuation of the disk brake 1 happens as follows: The rotating brake disk 4 exerts a frictional force in its direction of rotation on the movable friction brake lining pressed against it or contacting it, and this force displaces the moveable friction brake lining 3 in the direction of rotation of the brake disk 4. Via one of the two tappets 10, the moveable friction brake lining 3 displaces one of the two auxiliary pistons 8 in its cylinder bore. The auxiliary piston 8 generates a hydraulic pressure in the brake fluid, and this pressure is transmitted to the brake piston 5 through the open self-boosting valve 28. The other auxiliary piston 8 is pressed against its stop 11 by the hydraulic pressure and does not move. The brake piston 5 exerts a clamping force on the friction brake lining 3 that presses the movable friction brake lining 3 against the brake disk 4. The disk brake 1 of FIG. 1 is designed as self-locking; that is, the diameters of the auxiliary pistons 8 are selected in proportion to the diameter of the brake piston 5 such that the clamping force effected by the auxiliary pistons 8 increases. The clamping and hence braking force is regulated with the self-boosting valve 28. For increasing the braking force, the self-boosting valve 28 is opened, so that the brake piston 5 communicates hydraulically with the auxiliary pistons 8. For keeping the braking force constant, the self-boosting valve 28 is closed and as a result the brake fluid volume of the brake piston 5 is enclosed. For lowering the braking force, the brake piston 5 is made to communicate hydraulically through the self-boosting valve 28 with the pressureless hydraulic reservoir 30, so that the brake pressure drops. The disk brake 1 of FIG. 1 is a so-called auxiliary force brake, which for its actuation requires no muscle power or external force but instead, as the auxiliary force for actuating the disk brake 1, utilizes solely the frictional force exerted by the rotating brake disk 4 on the moveable friction brake lining 3 pressed against it.

The pressing of the movable friction brake lining 3 against one side of the brake disk 4 causes the brake caliper 2, embodied as a floating caliper, to be displaced transversely to the brake disk 4 and presses the fixed friction brake lining 7 against the other side of the brake disk 4, which as a result is braked by both friction brake linings 3, 7.

The movable friction brake lining 3 displaces only that particular auxiliary piston 8 that is disposed behind the friction brake lining 3, when viewed in terms of the direction of rotation of the brake disk 4. The other auxiliary piston 8 brings about the self-boosting of the disk brake 1 in the reverse direction of rotation of the brake disk 4. It can be omitted, if self-boosting is wanted for only one direction of rotation of the brake disk 4.

The antilock valve 15 remains closed during the actuation of the disk brake 1, and as a result the hydraulic reservoir 16 is hydraulically disconnected from the disk brake 1. Pressing the moveable friction brake lining 3 against the brake disk 4 for actuating the disk brake 1 or for initiating a braking event is effected with the hydraulic pump 29 or by means of connecting the brake piston 5 to the hydraulic reservoir 16 (pressure reservoir) by opening the antilock valve 15. After the initiation of the braking event, as already noted, the braking force is regulated with the self-boosting valve 28; the hydraulic pump 29 can be shut off and the antilock valve 15 can be closed. The hydraulic pump 29 with the pressureless hydraulic reservoir 30 and the antilock valve 15 with the hydraulic reservoir 16 (pressure reservoir) each form their own devices 29, 30; 15, 16 for pressing the moveable friction brake lining 3 against the brake disk 4 and thus for initiating a braking event. As long as no redundance is needed, then either the hydraulic pump 29 with the pressureless hydraulic reservoir 30 or the antilock valve 15 with the hydraulic reservoir 16 suffices as a device for pressing the moveable friction brake lining 3 against the brake disk 4.

To subject the hydraulic reservoir 16 (pressure reservoir) to pressure, the antilock valve 15 is opened during a braking event.

During a braking event, brake fluid can be pumped out of the pressureless hydraulic reservoir 30 to the auxiliary piston 8 by the hydraulic pump 29. As a result, the auxiliary piston 8 and with it the lining holder plate 9 with the friction brake lining 3 are moved back in the direction of their outset position. The self-boosting valve 28 is closed in this period; that is, the brake piston 5 is hydraulically disconnected from the auxiliary pistons 8.

The self-boosting valve 28 can be replaced by a valve arrangement for instance having two 2-way valves (not shown). Particularly in FIG. 1, the self-boosting valve 28 may also be conceived of as a braking force controlling, regulating or limiting valve.

With the pressure sensors 17, 18, it is possible to ascertain the coefficient of friction g between the brake disk 4 and the movable friction brake lining 3: For the measurement, with the disk brake 1 actuated and the antilock valve 15 closed, the self-boosting valve 14 is (briefly) closed, and the hydraulic pressure on the auxiliary pistons 8 and on the brake piston 5 is measured using the pressure sensors 17, 18. The pressure ratio multiplied by the ratios of the piston faces of the brake piston 5 and of the auxiliary pistons 8 yields the coefficient of friction $\mu$. For brake pressure regulation with the self-boosting valve 28, the brake pressure of the brake piston 5 measured with the sensor 18, can be measured as the variable that is to be regulated. For brake pressure regulation, the coefficient of friction Li is additionally ascertained, in the manner explained above.

Figure 2:
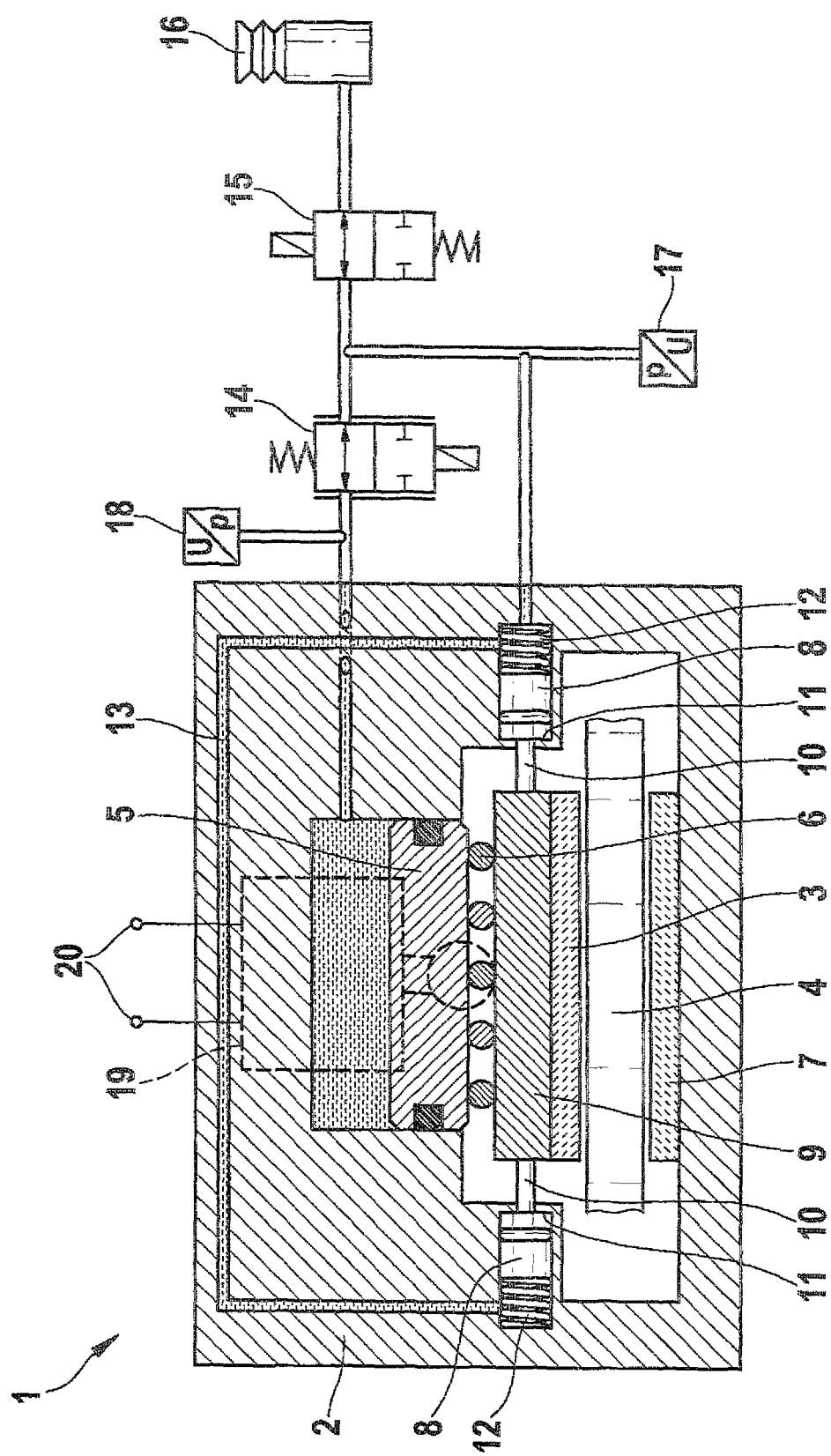
FIG. 2 is a schematic of a disk brake according to a second embodiment of the invention which includes an electromechanical actuator.

In the ensuing description of FIG. 2, essentially only the differences from FIG. 1 are shown, and the description of FIG. 1 is referred to as well. For components that match FIG. 1, the same reference numerals are used in FIG. 2.

In a distinction from FIG. 1, the disk brake 1 of FIG. 2 has an electromechanical actuator 19 for its actuation, with which actuator the movable friction brake lining 3 can be pressed against the brake disk 4. In the embodiment of the invention shown, a piezoelectric element is provided as the actuator 19. However, still other electromechanical actuators that have an electromagnet or an electric motor and a gear, or non-electromechanical actuators, for instance mechanical, pneumatic or hydraulic actuators, can be used (not shown) for actuating the disk brake 1. Except for the current connections 20 of the actuator and electric control lines, not shown, for the valves 14 and 15 and measurement lines for the pressure sensors 17, 18, the disk brake 1 requires no connections; in particular, no hydraulic connection for instance to a master cylinder or a hydraulic external energy supply is provided. However, a hydraulic connection of the brake piston 5 is possible, if the disk brake 1 is supposed to be hydraulically actuatable as an auxiliary brake (not shown) in the event that its actuator 19 fails.

Instead of the 3/3-way proportional magnet valve, the disk brake 1 of FIG. 2 has a 2/2-way proportional magnet valve as its self-boosting valve, which is disposed between the brake piston 5 and the auxiliary pistons 8 and with which the brake piston 5 can be made to communicate hydraulically with the auxiliary pistons 8 or be hydraulically disconnected from them. The antilock valve 15 with the hydraulic reservoir 16 is present, but the hydraulic reservoir, unlike FIG. 1, in FIG. 2 is a metal bellows reservoir, that is, a pressureless reservoir, in which approximately ambient pressure prevails. In FIG. 2, the hydraulic pump 29 with the pressureless reservoir 30 is absent.

The disk brake 1 of FIG. 2 has hydraulic self-boosting, which includes the auxiliary pistons 8, the brake piston 5, and the self-boosting valve 14 and which increases a braking force of the disk brake 1. For the self-boosting, the frictional force exerted by the rotating brake disk 4 on the movable friction brake lining 3 pressed against it is used as the auxiliary force for boosting the braking force. The magnitude of the self-boosting depends on the ratio of the piston faces of the auxiliary pistons 8 to the piston face of the brake piston 5.

By closure of the self-boosting valve 14, the brake piston 5 can be hydraulically disconnected from the auxiliary pistons 8 and the self-boosting can be limited or switched off, by means of partial closure of the self-boosting valve 14, embodied as a proportional valve, or by means of a modulated valve control, the magnitude of the self-boosting can be varied, controlled, or regulated. This makes a design of the disk brake 1 for self-locking operation possible by means of a suitable choice of the ratio of the piston diameters of the auxiliary pistons 8 to the piston diameter of the brake piston 5. The term "self-locking" means that the self-boosting is so high that the braking force of the disk brake 1 would increase up to the point of locking of the brake disk 4, if the braking force were not limited in a suitable way. The limitation of the braking force is effected as already noted by means of closure of the self-boosting valve 14. The design of the disk brake 1 may also be done such that approximately from a medium coefficient of friction μ, the limit for self-locking is exceeded. As a result of the limitation or control of the magnitude of the self-boosting and the attendant possibility of designing the disk brake 1 for the self-locking range, it is possible to use a low-power actuator 19.

To reliably prevent blocking of the brake disk 4, the antilock valve 15, which is closed for actuation of the disk brake 1, is provided. By opening of the antilock valve 15, the auxiliary pistons 8 are made to communicate hydraulically with the hydraulic reservoir 16. If at the same time the self-boosting valve 14 is opened, then the brake piston 5 is also made to communicate hydraulically with the hydraulic reservoir 16. The hydraulic pressure acting on the auxiliary pistons 8 and the brake piston 5 can as a result be lowered down to the pressure in the hydraulic reservoir 16, that is, to approximately ambient pressure. If the actuator 19 is switched off as well, then the disk brake 1 is unactuated and releases. The antilock valve 15 can be closed as soon as the brake disk 4 again begins to rotate.

By closure of the self-boosting valve 14, the brake fluid is enclosed in the cylinder bore of the brake piston 5. In this way, a clamping force of the actuated disk brake 1 can be kept constant without having to supply current to the actuator 19.

Figure 3:
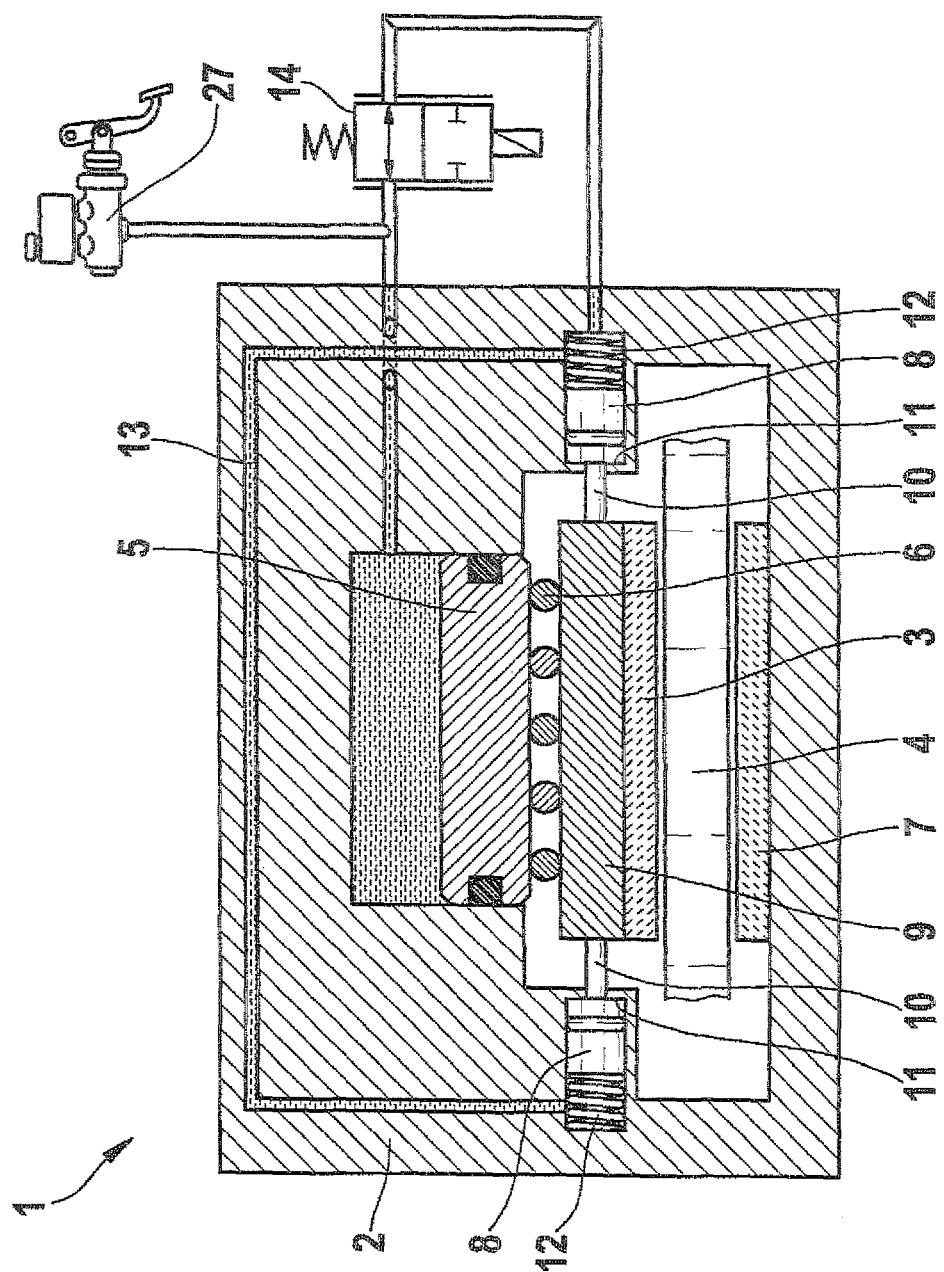
FIG. 3 is a schematic of a disk brake according to a third embodiment of the invention which is connected to a master cylinder of a hydraulic vehicle brake system.

In the ensuing description of FIG. 3, essentially only the distinctions from FIG. 2 will be shown, and the description of FIG. 2 will be referred to. For components matching FIG. 2, the same reference numerals are used in FIG. 3.

In agreement with FIG. 2, the disk brake 1 of the invention shown in FIG. 3 has a brake caliper 2 embodied as a floating caliper, in which a movable friction brake lining 3 is disposed on one side of a brake disk 4 and a fixed friction brake lining 7 is disposed on the other side of the brake disk 4. The brake piston 5 is also present, with which the movable friction brake lining 3 can be pressed against one side of the brake disk 4, and the two auxiliary pistons 8 are present, which communicate with the brake piston 5 through the self-boosting valve 14 and which can be disconnected hydraulically from the brake piston 5 by closure of the self-boosting valve 14. The self-boosting valve 14 is preferably embodied as a proportional valve, as in FIG. 2. In the disk brake 1 shown in FIG. 3, the antilock valve 15 and the hydraulic reservoir 16 are not provided, although they are nevertheless possible. The pressure sensors 17, 18 may, but need not necessarily, be present; they are not shown in FIG. 3.

The disk brake 1 shown in FIG. 3 is connected to a master cylinder 27 of an otherwise not shown hydraulic vehicle brake system known per se. In particular, the disk brake 1 is connected as a wheel brake to a hydraulic vehicle brake system that is an antilock system and that has traction control and/or an electronic stability or anti-skid program (ABS, TC, and ESP, respectively). By actuation of the master cylinder 27, the brake piston 5 of the disk brake 1 is subjected hydraulically to pressure and presses the movable friction brake lining 3 against the brake disk 4; that is, the disk brake 1 is actuated by actuation of the master cylinder 27. The brake piston 5 forms a hydraulic actuator of the disk brake 1, so that a separate actuator may (but need not necessarily) be dispensed with. The electromechanical actuator 19 of FIG. 2 is therefore not shown in FIG. 3.

Since in the disk brake 1 of FIG. 3 the brake piston 5 communicates with the master cylinder 27, the brake piston 5 is subjected to the hydraulic pressure generated in the master cylinder 27. The clamping force with which the brake piston 5 presses the movable friction brake lining 3 against the brake disk 4 is proportional to an actuation force with which the master cylinder 27 is actuated. Accordingly, the disk brake 1 of FIG. 3 is travel-boosting and not, like the disk brake 1 of FIG. 2, force-boosting. If the disk brake 1 of FIG. 3 is actuated, the rotating brake disk displaces the movable friction brake lining 3, pressed against it, in the direction of rotation. Via one of the two tappets 10, it displaces the auxiliary piston 8, disposed in the direction of rotation of the brake disk 4, and the auxiliary piston positively displaces brake fluid through the open self-boosting valve 14 into a cylinder bore of the brake piston 5. The brake fluid positively displaced by the auxiliary piston 8 displaces the brake piston 5 toward the brake disk 4 and reduces the volume of brake fluid to be furnished by the master cylinder 27 for actuating the disk brake 1. The actuation travel of the master cylinder 27 is accordingly shortened. By the choice of a master cylinder with a smaller piston diameter or of a larger diameter of the brake piston 5, because of the hydraulic travel boosting of the disk brake 1 of FIG. 3, a greater hydraulic force boosting from the master cylinder 27 to the brake piston 5 can be selected. Consequently, it is possible to use a master cylinder 27 without a brake booster. The hydraulic self-boosting device of the disk brake 1 of FIG. 3, which device includes the auxiliary pistons 8 and the brake piston 5, is travel-boosting, as explained. The frictional force exerted by the rotating brake disk 4 on the movable friction brake lining 3 pressed against it when the disk brake 1 is actuated is utilized as auxiliary force for the self-boosting.

Since the disk brake 1 is as usual connected hydraulically to the master cylinder 27, the pedal force upon actuation of the disk brake 1 feels to a vehicle driver like what he is used to With the self-boosting valve 14, an actuation force/travel curve when the coefficient of friction μ is fluctuating can be adapted to a desired course of the characteristic curve.

The force of the piston restoring springs 12 of the auxiliary pistons 8 in the disk brake 1 of FIG. 3 is not negligible; instead, the spring force of the piston restoring springs 12 is on the order of magnitude of the braking force of the disk brake, which is as high as the frictional force exerted, when the disk brake 1 is actuated, by the rotating brake disk 4 on the friction brake lining 3 pressed against it. The spring force of the fully-deployed restoring springs 12 is for example as high as, in any case is on the order of magnitude of, the maximum braking force or at least on the order of magnitude of a medium braking force of the disk brake 1. Because of this design, the restoring springs 12 prevent self-locking of the disk brake 1 or in other words locking of the brake disk 4. The spring force of the restoring springs 12 acts counter to the force with which the movable friction brake lining 3 is braced on the auxiliary piston 8. Effectively, the auxiliary piston 8 therefore acts on the hydraulic fluid with the differential force between the frictional force, which the rotating brake disk 4 exerts on the movable friction brake lining 3 pressed against it, and the spring force of the restoring springs 12. Since the spring force of the restoring springs 12 increases with their increasing deployment, it lessens the hydraulic pressure generated by the auxiliary piston 8. The self-boosting of the disk brake 1 of FIG. 3 therefore decreases within increasing displacement of the auxiliary piston 8, thereby preventing the self-locking.

Figure 4:
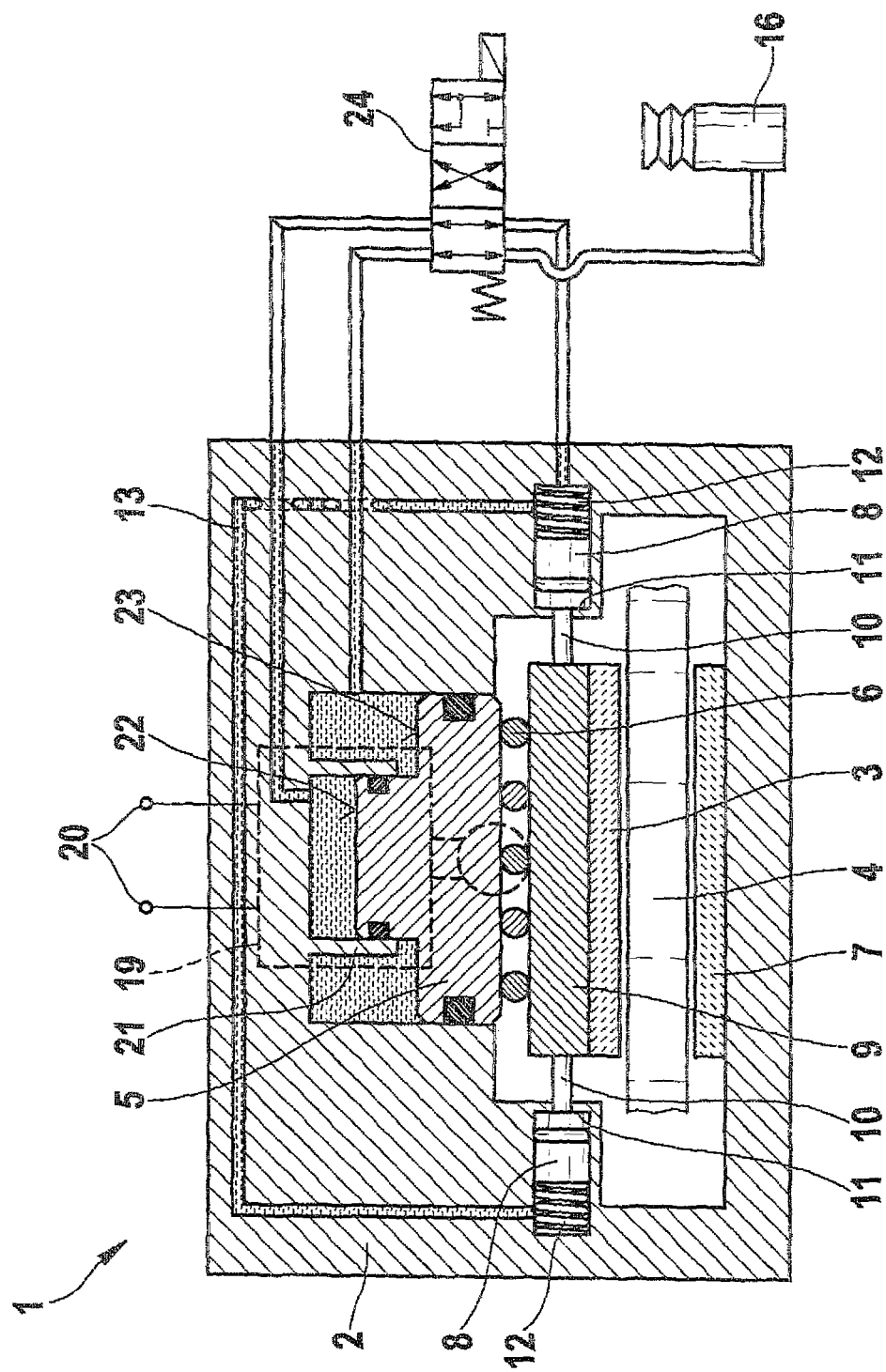
FIG. 4 is a schematic of a disk brake according to a fourth embodiment of the invention which has a stepped brake piston.
Figure 5:
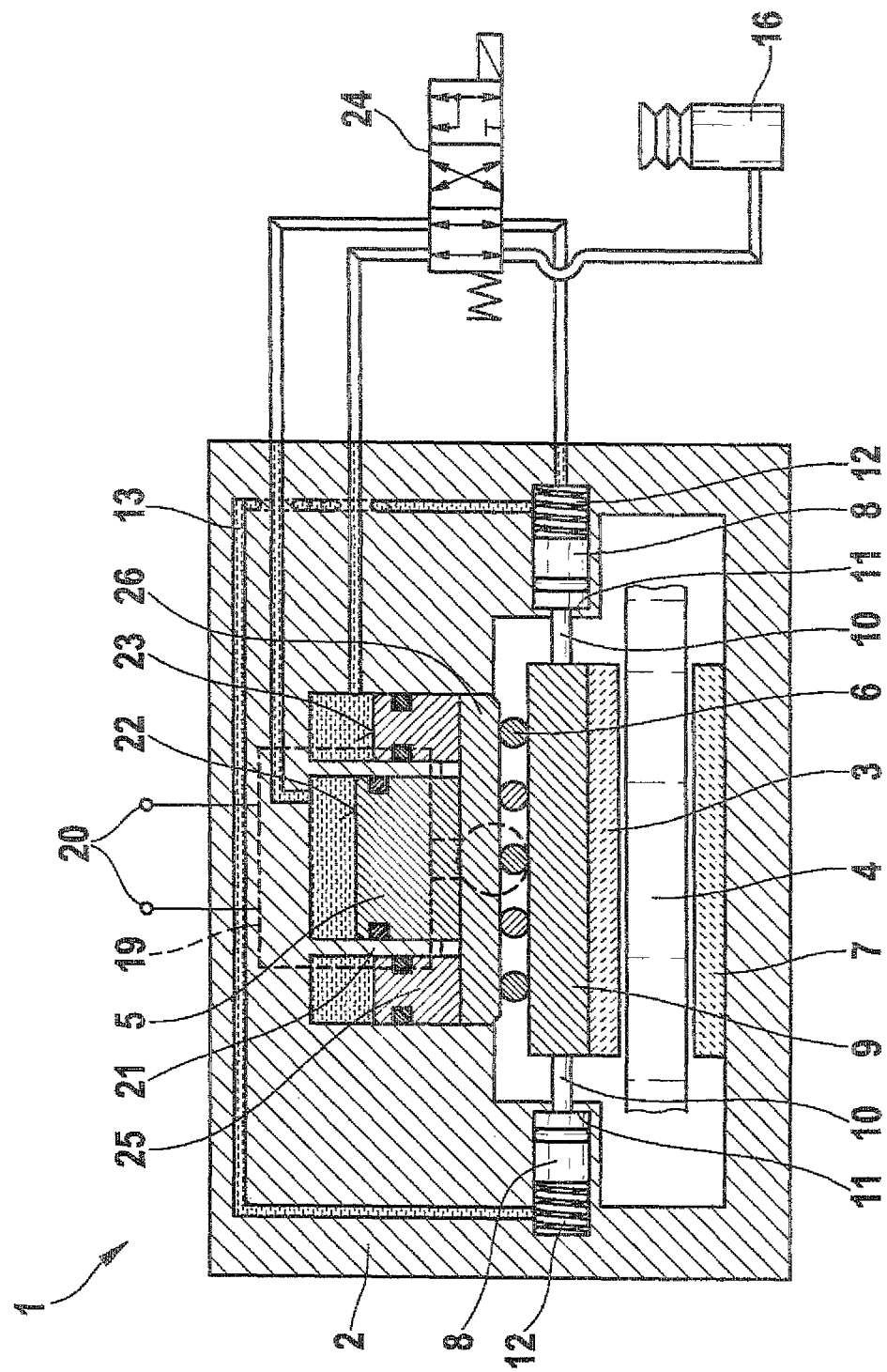
FIG. 5 is a schematic of a disk brake according to a fifth embodiment of the invention which has two brake pistons.

In the ensuing explanation of FIGS. 4 and 5, essentially only the distinctions from FIG. 2 will be shown, and the discussion of FIG. 2 will be referred to. For components matching FIG. 2, the same reference numerals are used in FIGS. 4 and 5.

The brake piston 5 of the disk brake 1 of the invention shown in FIG. 4 is a stepped piston, which besides plunging into the cylinder bore in the brake caliper 2 plunges into a tubular collar 21 which is embodied concentrically in the cylinder bore in the brake caliper 2. As a result, the brake piston 5 has two piston faces 22, 23 that can be acted upon hydraulically separately from one another, namely a circular face 22 and an axially offset circular-annular face 23 concentrically surrounding the circular face 22. The piston faces 22, 23 are of different sizes; in the embodiment of the invention shown, the circular-annular face 23 is larger than the circular face 22, or the relative size can be vice versa.

Instead of the self-boosting valve 14 and the antilock valve 15, the disk brake 1 of FIG. 4 has a 4/3-way magnet valve 24, with which selectively the circular face 22, the circular-annular face 23, or both the circular face 22 and the circular-annular face 23 can communicate with the auxiliary pistons 8. A further position of the valve 24 that is conceivable, although not shown, is one in which one or both piston faces 22, 23 of the brake piston 5 embodied as a stepped piston are hydraulically blocked; that is, the brake fluid volumes are trapped with a constant volume. As a result, the brake piston 5 can be fixed and a clamping force of the friction brake lining 3 against the brake disk 4 can be maintained if the actuator 19 is not receiving current. The piston face 22, 23 of the brake piston 5 that does not communicate with the auxiliary piston 8 is made to communicate through the valve 24 with the hydraulic reservoir 16. If both piston faces 22, 23 communicate with the auxiliary pistons 8, the valve 24 disconnects the hydraulic reservoir 16 from the hydraulic system of the disk brake 1.

Moreover, the disk brake 1 show in FIG. 4 is embodied identically to the disk brake 1 of FIG. 2 and functions basically in the same way. Like the disk brake 1 of FIG. 2, the disk brake 1 of FIG. 4 has the auxiliary pistons 8, which communicate with one another through the connecting line 13 and can be made by the valve 24 to communicate with the piston faces 22, 23 of the brake piston 5 and which together with the brake piston 5 form the hydraulic self-boosting device of the disk brake 1. The special feature of the disk brake 1 of FIG. 4 is that by means of the valve 24, selectively one or both of the piston faces 22, 23 can be made to communicate hydraulically with the auxiliary pistons 8. As a result, the magnitude of the self-boosting of the disk brake 1 can be adjusted in stages: If the auxiliary pistons 8 communicate with the circular face 22 of the brake piston 5 embodied as a stepped piston, then the disk brake 1 has low self-boosting. If the auxiliary pistons 8 communicate with the circular-annular face 23 of the brake piston 5, which is larger than the circular face 22, then the disk brake 1 has medium self-boosting. If both piston faces 22, 23 communicate with the auxiliary pistons 8, the disk brake 1 has high self-boosting. As a result, the self-boosting of the disk brake 1 of FIG. 4 can be adapted in stages to a high, medium and low coefficient of friction μ between the friction brake lining 3 and the brake disk 4, and the disk brake 1 can be operated at all times close to the limit at the transition from the self-locking-free range to the self-locking range, as a result of which a clamping force and actuating energy to be exerted by the actuator 19 are low. Also in the disk brake of FIG. 4, it is possible, although not show, for both piston faces 22, 23 of the brake piston 5 to communicate with the hydraulic reservoir 16 and thereby to shut off the self-boosting and prevent locking of the brake disk 4. The communication of the two piston faces 22, 23 with the hydraulic reservoir 16 may be accomplished as in FIG. 2 with a separate antilock valve or by means of a further switching position of the valve 24.

The disk brake 1 of FIG. 5 corresponds to the disk brake 1 of FIG. 4, except that in FIG. 5, the magnitude of the self-boosting that is adjustable in stages is attained not with one stepped piston but rather with two brake pistons 5, 25. One brake piston 25 is an annular piston that surrounds the other brake piston 5. A tubular collar 21 of the brake caliper 2 separates the two brake pistons 5, 25 from one another. Instead of two concentrically disposed brake pistons 5, 25, it is for instance also possible to provide two brake pistons disposed side by side (not shown) in the brake caliper 2. A pressure distribution plate 26 that covers the two brake pistons 5, 25 on their front sides facing toward the friction brake lining 3 and the brake disk 4 transmits a clamping force, exerted by the brake pistons 5, 25, to the movable friction brake lining 3.

The two brake pistons 5, 25 have piston faces of different sizes; like the piston faces 22, 23 of the brake piston 5, embodied as a stepped piston, of the disk brake 1 of FIG. 4, these faces can selectively be made to communicate hydraulically singly or together with the 4/3-way magnet valve 24. The disk brake 1 of FIG. 5 has low self-boosting if the brake piston 5 having the smaller piston face communicates with the auxiliary pistons 8, medium self-boosting if the brake piston 25 having the larger piston face communicates with the auxiliary pistons 8, and high self-boosting if both brake pistons 5, 25 communicate with the auxiliary pistons 8.

The foregoing relates to the preferred exemplary embodiment of the invention, it being understood that other variants and embodiments thereof are possible within the spirit and scope of the invention, the latter being defined by the appended claims.

The invention claimed is:

1. A disk brake, comprising:
   a friction brake lining;
   a brake disk;
   a brake piston configured to press the friction brake lining against the brake disk, the brake piston being disposed within a brake piston cylinder bore and including a piston face that is acted upon hydraulically within the brake piston cylinder bore;
   an auxiliary piston which is displaceable parallel to the brake disk within an auxiliary piston cylinder bore, the auxiliary piston cylinder bore being connected hydraulically with the brake piston cylinder bore through a hydraulic line, the friction brake lining being displaceable transversely and parallel to the brake disk and being braced in a circumferential direction on the auxiliary piston; and
   a valve disposed in the hydraulic line between the auxiliary piston cylinder bore and the brake piston cylinder bore,
   wherein the brake piston cylinder bore is hydraulically connected to receive brake fluid from a master cylinder through at least a portion of the hydraulic line such that the disk brake is travel-boosting, and the auxiliary piston has a restoring spring which has a spring force that acts counter to a force exerted on the auxiliary piston by the friction brake lining when the disk brake is actuated, and
   wherein the spring force is on an order of magnitude of a force exerted on the auxiliary piston by the friction brake lining when the disk brake is actuated to prevent locking of the brake disk.

2. The disk brake as defined by claim 1, wherein the brake piston has two piston faces that can be acted upon hydraulically separately and that can be selectively connected to the auxiliary piston by means of one or more valves.

3. The disk brake as defined by claim 2, wherein the brake piston is a stepped piston.

4. The disk brake as defined by claim 2, wherein the two piston faces are of different sizes.

5. The disk brake as defined by claim 1, wherein the disk brake has a further brake piston, and the two brake pistons can be selectively connected to the auxiliary piston by means of one or more valves.

6. The disk brake as defined by claim 5, wherein the two brake pistons have piston faces of different sizes.

7. The disk brake as defined by claim 5, wherein the auxiliary piston and the master cylinder are both connected hydraulically with the brake piston in a manner such that displacement of the auxiliary piston displaces brake fluid through the valve to the brake piston cylinder bore which then displaces the brake piston toward the brake disk which reduces a volume of brake fluid to be furnished by the master cylinder for actuating the disk brake.

8. The disk brake as defined by claim 1, wherein the disk brake has a device with which the friction brake lining can be pressed against the brake disk for actuating the disk brake.

9. The disk brake as defined by claim 8, wherein disk brake has a hydraulic pump, with which the brake piston can be subjected to pressure.

10. The disk brake as defined by claim 1, wherein the disk brake is self-locking.

11. The disk brake as defined by claim 1, wherein the disk brake has an actuator with which the friction brake lining can be pressed against the brake disk for actuating the disk brake.

12. The disk brake as defined by claim 1, wherein the disk brake has one pressure sensor for the brake piston and one pressure sensor for the auxiliary piston.

13. The disk brake as defined by claim 1, wherein the auxiliary piston or the brake piston communicates through an antilock valve with a hydraulic pressure reservoir.

14. The disk brake as defined by claim 1, wherein the disk brake has two oppositely displaceable auxiliary pistons, and the friction brake lining is braced on one of the two auxiliary pistons, depending on a direction of rotation of the brake disk.

15. The disk brake as defined by claim 1, wherein the auxiliary piston has a smaller piston face than the brake piston.

* * * * *